Sept. 13, 1966  J. LATZEN  3,272,541
BALL JOINTS
Original Filed June 10, 1954
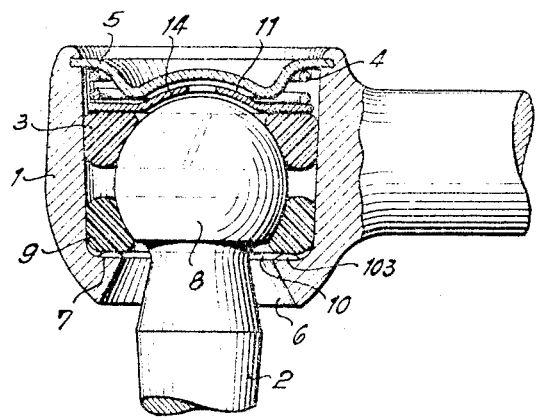
INVENTOR
JOSEF LATZEN
BY
*Strauch, Nolan & Diggins*
ATTORNEYS

United States Patent Office 3,272,541
Patented Sept. 13, 1966

3,272,541
BALL JOINTS
Josef Latzen, Siegfriedstrasse 7, Dusseldorf,
Oberkassel, Germany
Original application June 10, 1954, Ser. No. 435,890.
Divided and this application Feb. 8, 1963, Ser. No. 264,467
1 Claim. (Cl. 287—90)

This application is a division of my copending application, Serial No. 435, 890, filed June 10, 1954, and now abandoned.

The invention relates to a ball joint for the transmission of steering and control forces or the like, more especially for steering and control linkages of automobile vehicles, in which the spherical head of a pin rests in a concave surface in the joint housing, which latter is closed by a cover on that side remote from the outlet of the ball pin from the housing, and has for its object to provide an automatically self-adjusting ball joint which has a greater reliable effective life and freedom from maintenance on account of this fact.

It is based on the discovery that a really effective self-adjustment is only obtained when the self-adjustment is effected in all directions. Based on this discovery, the spherical head is non-positively secured in the housing both axially and in a direction transversely thereof. This non-positive securing of the ball pin in the housing provides, in addition to the self-adjustment which is obtained, the further advantage that the joint is less subjected to the disturbing effects of vibrations and shocks, more especially during angular deflections, because the power connection ensures a more or less yieldable taking up of these stresses without impairing the ball seating.

In detail, the power connection or closed linkage may be effected by the fact that a member resiliently enclosing the ball under pressure is provided above the plane extending transversely of the ball pin axis through the center of the spherical head.

Further features and advantages of the invention will become apparent from the following description in conjunction with the drawings, which illustrate different constructional examples of the invention, without the invention being restricted to such examples.

In the constructional example according to the figure, the interior of the joint housing 1 is tapered in a slightly conical manner from the housing aperture towards the outlet point 6 of the ball pin 2 from the joint housing. Inside the housing, an annular member 3 is inserted from the closure side and positioned above the plane disposed transversely of the axis of the ball pin through the center of the spherical head, which member is of wedge-shape in cross-section owing to the fact that it bears on the inside wall of the housing and the spherical head 8. The annular member is variable in diameter and may for this purpose consist of separate segments, a gap being left between adjacent segments. In a more advantageous form, the annular member consists of elastic material. Acting on the annular member is a helical spring 4 which is supported on the cover 5 of the housing.

The interior of the housing 1, tapering in slightly conical form from the side of the housing which is closed towards the point at which the pin 2 issues from the latter, extends as far as the outlet point 6, where it is defined by a shoulder 7. An annular member 9 bearing on the spherical head 8 is also provided below the plane transversely of the axis of tha ball pin 2 and extending through the center of the said head 8, the said member 9 consisting of a slotted ring of resilient material. A gap 10 is left between the shoulder 7 and the annular member 9. A resilient means 103 may be arranged on the shoulder 7 underneath the ring 9.

A plate 14 is provided between the spring 4 and the annular member 3, said plate being arched outwardly to correspond to the curvature of the ball head 8. A gap 11 is left between the outwardly curved plate 14 and the head 8. This gap 11 and the gap 10 operate as a wear gap, since the displacement clearance made possible thereby still permits the ball head to bear on the annular members, even when wear has occurred, depressed centrally in the form of a cup. The bottom depressed central link in the form of a cup. The bottom of the cupped portion is curved outwardly to correspond to the curvature of the ball head.

As elastic material in the ball joints constructed in accordance with the invention, it is recommended to employ glycol polyesters which are reacted with diisocyanates, preferably naphthalene diisocyanates. This material is characterized by particular strength properties, resistance to wear and also to aging, and may contain constituents increasing the sliding capacity. Morevover, plastics known as polyurethane may be used for the parts inserted in the housing and as a covering material for the ball head.

I claim:

A self-adjusting ball and socket joint particularly adapted for the steering and control linkages of automobiles comprising a joint housing having openings at opposite ends thereof, a ball head movably received within said joint housing, a ball pin connected to said ball head and extending outwardly through one of said openings in said joint housing, a cover closing the remaining opening in said joint housing, the inner wall of said joint housing having a slight conical taper from the closure side of the housing towards the side at which the ball pin projects from the housing, said conical taper of the inside of said joint housing extending as far as a shoulder at the outlet opening of the housing, resilient mounting means positioned within said housing to resiliently secure said ball head both axially of the ball pin and also transversely thereof to permit self-adjusting movement of said ball head in all directions, said mounting means including elastic ring means having a substantially wedge-shaped cross section compressed between said ball head and the inside wall of said housing and disposed so as to exert positive pressure on said ball head over an annular area of said ball head substantially symmetrical with the longitudinal axis of said ball pin and with substantial pressure components both axial of and transverse to said ball pin axis, said elastic ring means including a ring element of potentially variable diameter resiliently surrounding the cover side of said head and an oppositely disposed slotted ring element provided on the side at which the ball pin projects from the housing, said ring elements being spaced on either side of a line extending transverse to said ball pin axis and passing through the center of said head, said slotted ring element on the side of the head at which the ball pin projects from the housing being disposed in spaced relationship with said shoulder of said housing to provide a lower wear gap, a plate disposed between said cover and said ball head and bearing on a surface of said ring means, said plate having a curvature corresponding to that of said ball head and being spaced therefrom to provide a wear gap, and helical spring means extending between said cover and said plate, said helical spring means operating to load said ring means.

References Cited by the Examiner

UNITED STATES PATENTS

| | | |
|---|---|---|
| 2,361,025 | 10/1944 | Graham et al. |
| 2,507,087 | 5/1950 | Booth. |
| 2,749,161 | 6/1956 | Latzen. |
| 2,814,538 | 11/1957 | Connolly. |
| 2,841,428 | 7/1958 | Moskovitz. |
| 2,851,314 | 9/1958 | Thomson _____ 308—72 X |
| 3,025,090 | 3/1962 | Langen _____ 287—87 |

CARL W. TOMLIN, *Primary Examiner.*

A. V. KUNDRAT, *Assistant Examiner.*